United States Patent [19]

Chen et al.

[11] 4,362,757
[45] Dec. 7, 1982

[54] CRYSTALLIZED, READILY WATER DISPERSIBLE SUGAR PRODUCT CONTAINING HEAT SENSITIVE, ACIDIC OR HIGH INVERT SUGAR SUBSTANCES

[75] Inventors: Andy C. C. Chen, Belle Mead, N.J.; Clifford E. Lang, Jr.; Charles P. Graham, both of Hicksville, N.Y.; Anthony B. Rizzutto, Piscataway, N.J.

[73] Assignee: Amstar Corporation, New York, N.Y.

[21] Appl. No.: 199,553

[22] Filed: Oct. 22, 1980

[51] Int. Cl.³ .......................... C13F 3/00; C13F 1/02
[52] U.S. Cl. ...................................... 426/599; 127/29; 127/30; 127/58; 424/131; 426/650; 426/651; 426/658
[58] Field of Search .................. 127/30, 58; 426/599

[56] References Cited

U.S. PATENT DOCUMENTS

| | | | |
|---|---|---|---|
| 2,701,771 | 2/1955 | Johnson | 426/599 |
| 2,824,808 | 2/1958 | Gillett | 127/30 |
| 3,114,641 | 12/1963 | Sperti | 426/599 |
| 3,365,331 | 1/1968 | Miller | 127/30 |
| 3,518,095 | 6/1970 | Harding | 127/30 |
| 3,582,399 | 6/1971 | Black | 127/30 X |
| 3,619,294 | 11/1971 | Black | 127/30 |
| 3,764,346 | 10/1973 | Noznick | 426/651 |
| 3,767,430 | 10/1973 | Earle | 426/651 X |
| 3,802,915 | 4/1974 | Gupta | 127/30 X |
| 3,914,439 | 10/1975 | Graves | 426/651 X |
| 4,113,865 | 9/1978 | Dondi | 426/599 X |
| 4,271,202 | 6/1981 | Giel | 426/651 X |
| 4,281,026 | 7/1981 | Reale | 426/599 |

*Primary Examiner*—Sidney Marantz
*Attorney, Agent, or Firm*—Cooper, Dunham, Clark, Griffin & Moran

[57] ABSTRACT

A crystallized sugar product containing a heat-sensitive, acidic, or high invert sugar substance is prepared by admixing the heat-sensitive, acidic, or high invert sugar substance with a dry sugar base to form a premix, concentrating a sugar syrup containing at least about 85% by weight sucrose to a solids content of about 95% to about 98% by heating to a temperature of about 255° F. to about 300° F., mixing the premix with the concentrated sugar syrup to form a mixture, subjecting the mixture to impact beating within a crystallization zone until a dry crystallized sugar product is formed, and recovering the sugar product from the crystallization zone. The resulting sugar product comprises aggregates of fondant-size sucrose crystals intimately associated with the heat-sensitive, acidic, or high invert sugar substance. The sugar product is dry, granular, free-flowing, non-caking, and readily dispersible in water.

9 Claims, 1 Drawing Figure

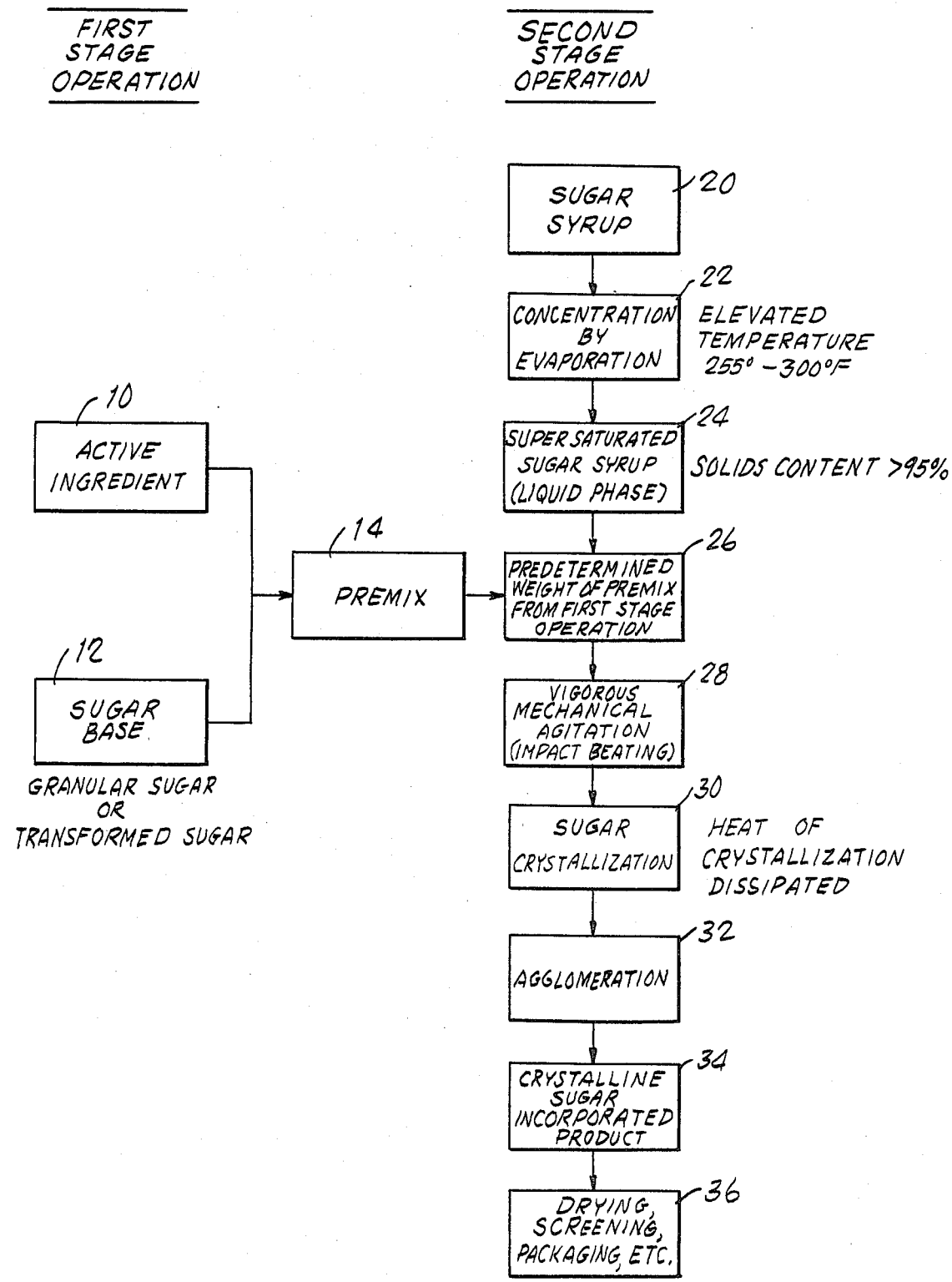

CRYSTALLIZED, READILY WATER DISPERSIBLE SUGAR PRODUCT CONTAINING HEAT SENSITIVE, ACIDIC OR HIGH INVERT SUGAR SUBSTANCES

BACKGROUND OF THE INVENTION

This invention relates to a process of producing a granular, free-flowing, non-caking sugar incorporated product. More specifically, this invention relates to a crystallized sugar product which incorporates a heat-sensitive, acidic, or high invert sugar content substance and to a process for making the sugar incorporated product.

In the manufacture of sugar products, a process known as the transforming process is used to produce a dry, granular, free-flowing, non-caking sugar product which is readily dispersed in water. This transforming process has been described in U.S. Pat. Nos. 3,149,682 (Tippens et al.), 3,365,331 (Miller et al.), and 4,159,210 (Chen et al.). In Tippens et al., the method comprises concentrating a sugar syrup to about 95-97% by weight solids by heating the sugar syrup to a temperature in the range of about 250°-265° F., and immediately subjecting the resulting supersaturated sugar syrup to a heat dissipation operation simultaneously with vigorous agitation. The method produces a dry sugar product comprising aggregates of fondant-size (3-50 microns) sucrose crystals. Miller et al. describes a similar process in which impact beating is used to crystallize the sugar product from the supersaturated sugar syrup.

The feed syrup which is used in the processes of Tippens et al. and Miller et al. has a purity in the range of 85-97% by weight sucrose. Thus, invert sugar (equal portions of glucose and fructose), which has a tendency to cake, may not comprise more than about 15% by weight of the feed sugar syrup.

The sugar products prepared in accordance with the processes of Tippens et al. and Miller et al. are useful as carriers for food additives, such as colorants, flavorants, and pharmaceuticals. The food additives may be introduced into the sugar syrup at either the concentration or the crystallization stage of the processes, depending on the nature of the additive. However, the high temperatures used in the transforming process (about 250°-265° F.) restrict the nature of the food additives which may be incorporated into the final sugar product. Heat-sensitive ingredients, such as volatile flavors or enzymes, cannot be incorporated into the sugar product by the methods described. Further, acidic ingredients, such as Vitamin C or fruit juices, change sucrose into invert sugar by the reaction known as sugar inversion. A further restriction in these processes is that the feed syrup must contain less than 15% by weight invert sugar.

Accordingly, it is an object of this invention to provide a sugar product which incorporates an edible heat-sensitive, acidic, or high invert sugar substance.

It is also an object of this invention to provide this sugar product in granular, free-flowing, noncaking form.

It is also an object to provide this sugar product in a form which is readily dispersed or dissolved in water.

It is a further object of this invention to provide a method of preparing this sugar product.

These and other objects are accomplished by means of the present invention described below.

SUMMARY OF THE INVENTION

By means of the present invention, a crystallized sugar product is produced which incorporates a heat-sensitive, acidic, or high invert sugar substance. The product is dry, granular, free-flowing, and non-caking. The product is composed of agglomerates or aggregates of minute, fondant-size sucrose crystals or particles intimately associated with the active ingredient. Due to its porous structure, the crystallized sugar product is readily dispersed or dissolved in water.

The crystallized sugar product of the present invention is prepared in a two-stage process. In the first stage, a premix is prepared by mixing a dry granular or transformed sugar base with a heat-sensitive, acidic, or high invert sugar substance. In the second or cocrystallization stage, the crystallized sugar product is prepared by concentrating a sugar syrup to about 95-98% by weight solids by heating at a temperature in the range from about 255°-300° F., mixing the concentrated sugar syrup with a predetermined amount of the premix, subjecting the new mixture to impact beating within a crystallization zone until a crystallized sugar product made up of aggregates of fondant-size sucrose crystals and the heat-sensitive, acidic, or high invert sugar substance is formed, the crystallized sugar product having a moisture content of less than 2.5% by weight, and recovering the crystallized sugar product from the crystallization zone. If desired, the resulting crystallized sugar product may be dried to a moisture content of less than 1% by weight, followed by screening to a uniform size and packaging.

DETAILED DESCRIPTION OF THE INVENTION

The accompanying drawing is a flow chart illustrating a preferred process or scheme for preparing a crystallized sugar product in accordance with the present invention.

Referring to the flow chart, the process of the present invention comprises two stages. In the first stage, a premix containing an active ingredient is prepared. The active ingredient 10 in a dry state is blended with a dry sugar base 12 such as a granular or transformed sugar, to form a dry premix 14. The active ingredient comprises a heat sensitive, acidic, or high invert sugar substance. For example, the active ingredient may be a heat sensitive substance, such as a volatile flavor or an enzyme, or an acidic substance, such as Vitamin C (ascorbic acid) or a fruit juice concentrate, or a high invert sugar substance, such as honey or molasses. The dry sugar base may be pure sucrose or may contain up to about 15% by weight of non-sucrose solids comprising additional monosaccharides, disaccharides, or modified dextrins. For example, the non-sucrose solids may comprise invert sugar, dextrose, fructose, corn syrup, maltodextrins, or mixtures thereof. The amount and type of sugar base which is used may vary depending upon the amount and nature of the active ingredient. The active ingredient is blended with the sugar base, for example, by means of a Hobart Blender, until the desired degree of homogeneity of the premix is achieved.

In the second stage of the operation, cocrystallization of sugar with the active ingredient is achieved. A sugar syrup 20 containing at least 85% sucrose is concentrated by evaporation 22, under vacuum or under atmospheric pressure, at a temperature in the range of about 255°-300° F., depending upon the nature of the active material, until the solids content of the concentrated sugar syrup exceeds about 95%. The non-sucrose solids in the feed syrup may comprise additional monosaccharides, disaccharides, or modified dextrins, for example, invert sugar, dextrose, fructose, corn syrup, maltodextrins, or mixtures thereof.

The resulting supersaturated sugar syrup 24 having a solids content exceeding about 95% by weight is maintained at a temperature not less than about 240° F. in order to prevent premature crystallization. A predetermined amount of the premix prepared in the first stage of the process is added 26 to the concentrated syrup with vigorous mechanical agitation or impact beating 28 within a suitable crystallization zone, such as a Hobart Mixer or Turbulizer. Alternatively, the concentrated syrup may be added to a predetermined amount of the premix and mixed in a similar manner.

Impact beating is continued until the resulting supersaturated syrup is transformed, crystallized 30, and agglomerated 32. A crystalline sugar incorporated product 34 is recovered from the crystallization zone. The latent heat of crystallization is sufficient to evaporate the moisture so that the product is substantially dry, i.e., has a moisture content of less than about 2.5%. If desired, the crystallized sugar product 34 may be further dried to a moisture content of less than 1%, followed by screening and packaging 36.

During crystallization, it is desirable to remove the heat of crystallization to prevent overheating within the crystallization zone. The heat of crystallization can be removed or dissipated by indirect heat exchange e.g., by surrounding the crystallization zone with a water jacket, or, preferably, by forced air flow through the beater-crystallizer, e.g., with a vapor separator.

Suitable apparatus for carrying out the process of the present invention is described in U.S. Pat. No. 3,365,331 (Miller et al.).

In order to ensure maximum homogeneity in the final product, it is desirable to introduce the premix into the concentrated syrup as early in the process as practical. However, in most cases, the premix is introduced during the sugar crystallization step in order to prevent deterioration of the active ingredient by the high temperature. The premix becomes thoroughly mixed in the earlier stages of the crystallization step as the concentrated syrup is transformed from the liquid state to a semi-solid state. Consequently, when the syrup reaches the relatively dry agglomerated state, the resulting product is a homogeneous blend of the cocrystallized sugar and active ingredient.

The physical structure of the crystallized sugar product is highly dependent on the rate and temperature of impact beating and crystallization, and on the degree of sugar transformation. The optimum time for the concentrated syrup mixture to spend in the crystallization zone during impact beating depends on several factors including: (a) the nature of the non-sucrose solids (such as invert sugar and ash) in the syrup; (b) the nature and characteristics of the active ingredient (such as moisture content, invert sugar content pH, etc.); (c) the concentration of the active ingredient in the premix; and (d) the temperature used for concentration of the feed syrup.

In structure, the crystallized sugar products of the present invention is comprised of aggregates or agglomerates of fondant-size sucrose crystals, e.g., in the range of about 3–50 microns, intimately associated with the non-sucrose solids. The agglomerates form a loose, lacey network bonded together at their interfaces by point contact. Accordingly, aqueous liquid can rapidly penetrate the porous cluster of agglomerates and free each of the particles making up the agglomerates. The particles thus become readily dispersed and/or dissolved in the aqueous liquid.

In the crystallized sugar product of the present invention, the active ingredient is incorporated as an integral part of the sugar matrix and there is no tendency for the active ingredient to separate or settle out during handling, packaging, or storage. The resulting product is granular, free-flowing, non-caking, and is readily dispersed or dissolved in water. Data from a typical analysis of three different sugar incorporated products prepared in accordance with the present invention are presented in Table I.

TABLE I

|  | Honey Flavored Sugar | Sugar Incorporated Invertase Product | Sugar Incorporated Grape Juice Product |
|---|---|---|---|
| First-Stage Operation: |  |  |  |
| (Premix Preparation) |  |  |  |
| Composition | Honey/Sugar | Liquid Invertase/Sugar | Grape Juice Concentrate (68° Brix)/Sugar |
| (Wt. Ratio) | (1/1) | (1/9) | (3/7) |
| Second-Stage Operation: |  |  |  |
| Composition | Premix/Sugar | Premix/Sugar | Premix/Sugar |
| (Wt. Ratio) | (2/3) | (1/1) | (1/1) |
| Elevated Temperature | 285° F. | 270° F. | 290° F. |
| Solids Content Of Supersaturated Solution (Wt. %) | 98.1 | 97.0 | 98.5 |
| Finished Product Analysis |  |  |  |
| Sucrose (Wt. %) | 79.5 | 94.8 | 88.65 |
| Invert Sugar Content (Wt. %) | 17.2 | 0.13 | 9.12 |
| Moisture Content (Wt. %) | 0.75 | 0.45 | 0.65 |
| Screen Analysis (%) |  |  |  |
| No. 28 | 28.5 | 18.2 | 25.8 |
| No. 35 | 21.7 | 17.0 | 24.5 |
| No. 48 | 25.6 | 20.5 | 20.5 |
| No. 65 | 12.5 | 17.8 | 17.6 |
| No. 100 | 8.6 | 12.4 | 9.5 |
| No. 200 | 2.5 | 10.0 | 1.6 |

TABLE I-continued

| | Honey Flavored Sugar | Sugar Incorporated Invertase Product | Sugar Incorporated Grape Juice Product |
|---|---|---|---|
| Pan | 0.6 | 4.1 | 0.5 |

A wide variety of products may be made in accordance with the present invention. The following examples illustrate some embodiments of this invention but are not meant in any way to limit the scope thereof.

A flavored sugar product may be prepared by incorporating a flavorant into a crystalline sugar matrix. The flavorants include volatile flavors, such as acetaldehyde or diacetal, nonvolatile flavors, such as natural flavor extracts or artificial flavorings, and essential oils, such as lemon oil or peppermint oil. The product made in this manner provides a fast flavor-releasing character due to the crystalline sugar matrix.

EXAMPLE 1

100 grams of natural peppermint oil in a dry state was blended with 300 grams of granular sugar (Bakers Special Grade) using a Hobart Blender. At the same time, 700 grams of a 65° Brix sugar solution was concentrated at 260° F. to 95% by weight solids content. 300 grams of the peppermint oil-sugar premix was added to the supersaturated, hot syrup with mechanical agitation by an impact beater. Impact beating continued until crystallization occurred and a dry sugar product incorporating the peppermint oil was produced.

EXAMPLE 2

A maple flavored sugar product was prepared according to the process described in Example 1. 100 grams of artificial maple flavor (containing 2.5% maple flavor, FMC6829) was dry-blended with 300 grams of granular sugar (Bakers Special Grade). 300 grams of the premix was added to the hot, supersaturated syrup with impact beating until a dry product was formed.

In another embodiment, a high invert sugar substance, such as honey or molasses, is incorporated into a crystalline sugar matrix. The product made in this manner possesses free-flowing and non-caking properties while retaining a natural delicate flavor.

EXAMPLE 3

200 grams of transformed sugar (Di-Pac ®) was blended with 200 grams of pure honey to form a slurry. 600 grams of a supersaturated sugar syrup, prepared in Example 1, was then added to the premix with agitation. Stirring was continued until the mixture was transformed into a dry sugar product. The product possesses free-flowing characteristics and has a delicate honey taste.

EXAMPLE 4

A product was prepared as in Example 3 using molasses instead of honey.

In another embodiment, a dehydrated fruit juice product is prepared by incorporating a fruit juice concentrate into a crystalline sugar matrix. The resulting product is a free-flowing, nonperishable dry powder which can be used in dry blending formulations.

EXAMPLE 5

100 grams of natural apple juice concentrate (65°Brix) was admixed with 400 grams of granular sugar (Bakers Special Grade) to form a slurry. 777 grams of sugar solution at 65° Brix was heated to 285° F. to form a supersaturated syrup of approximately 98% solids content. The supersaturated sugar solution was added to the premix with impact beating. Impact beating was continued and crystallization proceeded until a dry powdered product was formed.

EXAMPLE 6

150 grams of grape juice concentrate (68° Brix) was mixed with 350 grams of sugar (Bakers Special Grade) to form a slurry. The process continued as in Example 5. The grape juice incorporated product can be used in a grape jelly mix formulation by dry blending with 10.7 grams of pectin.

In another embodiment, a vitamin, such as oxidative vitamin A,C,D,E, or K, is incorporated into a sugar matrix. The resulting product is a homogeneous mixture with high stability. It can be used to fortify other foods.

EXAMPLE 7

10 grams of Vitamin A palmitate (Type 250-SD Hoffmann-LaRoche) was admixed with 390 grams of transformed sugar (Di-Pac ®) to form a premix. 600 grams of a heated, supersaturated sugar syrup, prepared as in Example 1, was added to the premix with mechanical agitation. Stirring was continued until the sugar was transformed and agglomerated into a dry sugar product. One gram of this incorporated product provides exactly 2,500 I.U. of Vitamin A.

In another embodiment, a chemical having beneficial properties, such as ferrous sulfate, dicalcium phosphate, sodium bicarbonate, or a trace mineral is incorporated into a sugar matrix. The product is a homogeneous mixture of the ingredients and can be used to fortify other foods.

EXAMPLE 8

2.08 grams of stannous fluoride was mixed with 297.92 grams of transformed sugar (Di-Pac ®) to form a premix. 600 grams of a heated supersaturated sugar syrup, prepared as in Example 1, was added to the premix with impact beating. Impact beating was continued and crystallization proceeded, eventually resulting in the formation of a dry powdered product. In spite of the high chemical activity and acidity of the fluoride, this chemical was successfully incorporated into the sugar matrix and the resulting product provides exactly 1,000 ppm/gram of the fluoride.

EXAMPLE 9

Example 8 was repeated except that 100 grams of ferrous sulfate was blended with 300 grams of sugar to form the premix. Sugar inversion by the sulfate was avoided due to the present process. The homogeneous iron product can be used to fortify other foods.

In another embodiment, a dry enzyme product or an active culture is produced by incorporating an enzyme, such as invertase, cellulose, glucose, isomerase, amylase, catalase, glucose oxidase, lactase, or pectinase, or an active culture, into a sugar matrix. Notwithstanding the high temperature of the process, the enzyme remains in its active form.

EXAMPLE 10

50 grams of purified invertase in liquid form (Convertit ®, Wallerstein Company) was mixed with 450 grams of transformed sugar (Di-Pac ®) to form the premix. 600 grams of a hot supersaturated sugar syrup, prepared as in Example 1, was added to the premix with mechanical agitation. The agitation was continued until the sugar was transformed, crystallized and agglomerated. The incorporated product (10 grams) was evaluated with respect to its inverting capabilities by blending with various concentrations of liquid sugar (10–40 grams per 100 mls.) and incubated at 30° C. and 55° C. for 1.5 hours. In spite of the high temperature used in the process, the experimental results indicate that a significant portion of the invertase remained active.

In another embodiment, a natural colorant, such as annatto extracts, beet juice concentrates, beta-carotene, grape skin extracts, oleoresin paprika, or tumeric extracts, is incorporated into a sugar matrix. The incorporated product is a homogeneous, stable, dry powder which shows no loss of color strength or hue and which can be used in dry blend formulations.

EXAMPLE 11

100 grams of tumeric color (PT 8-S, Hansen Laboratory) was blended with 400 grams of granular sugar (Bakers Special Grade) to form a premix. 500 grams of heated, supersaturated sugar solution, prepared as in Example 1, was added to the premix with vigorous agitation. The agitation was continued until all the sugar was crystallized. The incorporated product was evaluated for color hue and for color strength (Bexin content). Results showed no significant change in both characteristics despite exposure to the high temperature cocrystallization process.

In another embodiment, an acidulent substance, such as malic acid, fumaric acid, adipic acid, tartaric acid, citric acid, and sodium citrate, is incorporated into a sugar matrix. The resulting product is a free-flowing homogeneous powder which can be used in dry blend formulations.

EXAMPLE 12

The process of Example 11 was repeated using citric acid instead of tumeric colorant.

In another embodiment, an emulsifier, such as lecithin, mono- and diglycericides, propylene glycol esters, sorbitan esters, polysorbate esters, polyoxyethylene sorbitan esters, or lactylated esters, is incorporated into a sugar matrix. The crystallized product permits rapid dispersion of the emulsifier in emulsification applications. The crystallized product, when added to cake mix or icing mix, provides excellent emulsion characteristics. For example, cake volume, porosity, and appearance, and icing stability and density are improved with the sugar incorporated emulsifier as compared with an emulsifier added in the conventional manner.

EXAMPLE 13

100 grams of lecithin (Centrophase C, Central Soya) was mixed with 200 grams of granular sugar (Bakers Special Grade) to form a premix. 800 grams of a heated, supersaturated sugar syrup, prepared as in Example 1, was added to the premix with impact beating. Impact beating was continued and crystallization proceeded, eventually resulting in the formation of a dry powdered product.

EXAMPLE 14

The incorporation method was the same as that used in Example 3, using a monoglyceride (Myverol 18-07, Kodak) instead of lecithin.

In spite of the high temperature employed in the present process, the resulting products are free-flowing, non-caking, dry, homogeneous, stable, non-perishable, and are readily dispersed or dissolved in water.

While the invention has been described with reference to specific embodiments, these were for the purposes of illustration only and should not be constructed to limit the scope of the present invention.

We claim:

1. A method for preparing a cocrystallized sugar product containing an active ingredient selected from the group consisting of heat-sensitive, acidic, and high invert sugar substances, comprising:
   (a) admixing the active ingredient with a dry sugar base to form a premix;
   (b) concentrating a sugar syrup at a temperature in the range of about 255° F. to about 300° F. to a solids content of about 95% to 98% by weight, said sugar syrup containing no more than about 15% by weight non-sucrose solids;
   (c) directly admixing the concentrated sugar syrup at a temperature 255°–300° F. with said premix to form a mixture;
   (d) subjecting said resulting mixture upon admixing said premix to impact beating within a crystallization zone until a crystallized sugar product is formed, said crystallized sugar product made up of aggregates of fondant-size sucrose crystals and the active ingredient and having a moisture content of less than about 2.5% by weight; and
   (e) recovering said crystallized sugar product from said crystallization zone.

2. The method of claim 1 further comprising drying said crystallized sugar product to a moisture content of less than about 1% by weight.

3. A crystallized sugar product made in accordance with the method of claim 1.

4. The crystallized sugar product of claim 3 wherein the active ingredient is a volatile flavor, a nonvolatile flavor, or an essential oil.

5. The crystallized sugar product of claim 3 wherein the active ingredient is honey.

6. The crystallized sugar product of claim 3 wherein the active ingredient is molasses.

7. The crystallized sugar product of claim 3 wherein the active ingredient is a fruit juice.

8. The crystallized sugar product of claim 7 wherein the fruit juice is orange juice.

9. The crystallized sugar product of claim 7 wherein the fruit juice is grape juice.

* * * * *